Jan. 13, 1953        J. LA ROCCA        2,625,193
TRACTION DEVICE FOR PNEUMATIC TIRES
Filed April 13, 1948
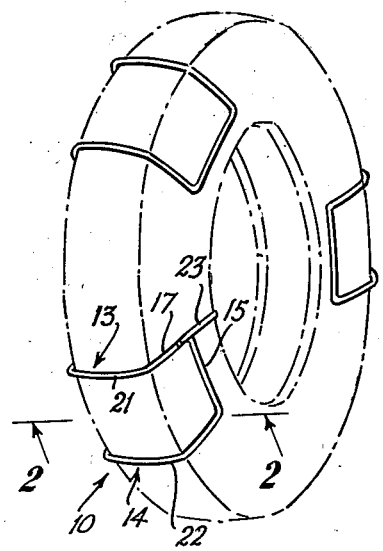
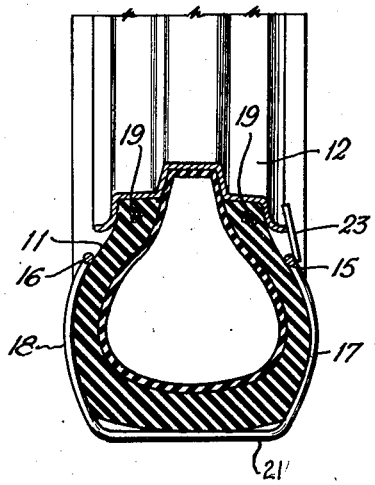
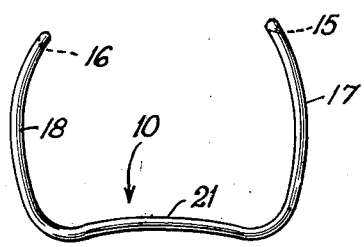
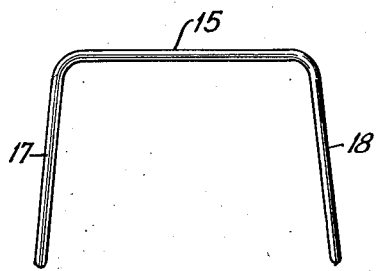
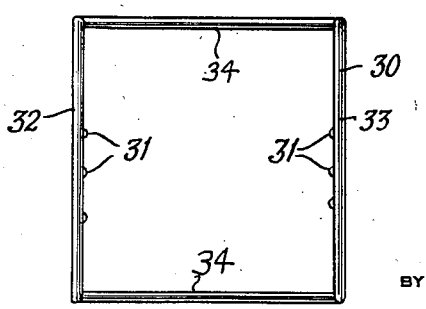
INVENTOR
JOSEPH LAROCCA
BY West & Oldham
ATTORNEYS

Patented Jan. 13, 1953

2,625,193

UNITED STATES PATENT OFFICE 2,625,193

TRACTION DEVICE FOR PNEUMATIC TIRES

Joseph La Rocca, Cleveland, Ohio

Application April 13, 1948, Serial No. 20,807

4 Claims. (Cl. 152—225)

This invention relates to traction devices, specially to traction devices that are adapted to be engaged with circumferentially spaced portions of a pneumatic tire.

Heretofore, there have been many different types of traction devices provided for use with pneumatic tires, many of which traction devices have been in the form of continuous elements designed for engagement with the periphery of a tire. These elements have been difficult to attach and detach, especially where the tire is in a location where additional traction is required to extract the vehicle on which the tire is mounted from its present location. In other words, continuous elements such as chains are very difficult, if not impossible, to affix to a tire when the tire is stuck in a mud hole, or the like. Other types of traction devices, such as separate links of chain have been provided which are designed for attachment to localized portions of a pneumatic tire. Again, such devices may be difficult to engage with a pneumatic tire assembly, or the traction provided thereby may not be sufficient to function effectively.

The general object of the present invention is to provide an improved, novel traction element adapted for releasable engagement with localized portions of a pneumatic tire.

Another object of the invention is to provide a traction device which is completely self-contained and without detachable elements therein.

A further object of the invention is to provide a traction device for a pneumatic tire wherein the traction device is provided with upstanding end portions adapted to engage, resiliently, with the side walls of a tire.

A further object of the invention is to provide a sturdy traction device of inexpensive construction, which device is adapted for a long service life without maintenance or adjustment thereof.

A further object of the invention is to provide a traction element which is adapted to be automatically forced into tighter engagement with a pneumatic tire at the instant wherein traction is being provided by the device.

Still another object of the invention is to provide a traction device that can be engaged with a pneumatic tire and which can readily be pried from engagement with the tire.

The foregoing and other objects and advantages of the invention will be made apparent as the specification proceeds.

Reference is made to the accompanying drawing wherein—

Fig. 1 is a perspective view showing several traction devices, embodying the principles of the invention, engaged with a pneumatic tire which is shown in diagrammatic form;

Fig. 2 is a transverse section taken on line 2—2 of Fig. 1 with the tire and rim being shown in full lines;

Fig. 3 is a side elevation of the traction device of the invention;

Fig. 4 is an elevation of the device of Fig. 3; and Fig. 5 is a plan of modification of the invention.

Attention is now directed to the details of the structure shown in the accompanying drawing and a traction device 10 is shown. The traction device 10 is adapted for releasable engagement with a pneumatic tire, such as a tire 11 that is shown mounted on a rim 12. The traction device 10, as a salient feature of the invention, is formed from a wire loop that is of generally rectangular shape and which has sides 13 and 14 and ends 15 and 16. The end portions of the sides 13 and 14 are bent or otherwise shaped so as to provide a pair of opposed, upstanding end portions 17 and 18 in the traction device. The wire loop originally was of planar shape and the center portions of the sides 13 and 14 were slightly farther apart than the remainder of the loop so that the end portions of the sides of the loop had to extend slightly inwardly of the loop in order to connect to the ends 15 and 16 of the loop. Such feature of the traction device of the invention facilitates retention of the loop in engagement with a pneumatic tire. Fig. 4 best illustrates this particular shape of the sides of the wire loop and its effect on the device 10. Fig. 3 best illustrates that the end portions 17 and 18 of the wire loop are of a flat arcuate shape whereby the ends 15 and 16 are actually positioned closer together than the end portions of the sides 13 and 14 immediately there adjacent. Fig. 2 illustrates that such a shape of the end portions 17 and 18 brings the ends 15 and 16 into engagement with the side walls of the tire 11 immediately adjacent the beads 19 of the tire. Since all pneumatic tires have the general configuration of being narrower at the beads and at the tread than they are intermediate such radially spaced portions of a tire, it is possible to use such shaping of a tire for retaining the traction device 10 in releasable engagement with a tire.

As a further feature of the invention, the wire loop forming the traction device has the portions of the sides 13 and 14 which form more or less bases 21 and 22 for the traction device, are provided with a flat, inwardly extending, arcuate contour. This shape of the bases 21 and 22 of the traction device is indicated in Fig. 3 as the device would be when under no load. However, when load is applied to the bases 21 and 22 of the traction element, then the curved contour of same tends to be flattened out and such action in turn tends to bring the end portions 17 and 18 into closer relationship whereby a greater gripping action of the traction device 10 on a pneumatic tire will be effected each time the traction device comes into contact with the ground.

In some instances, it may be desirable to provide a springy contact strip 23 which can be welded to or otherwise secured to the traction device 10. This contact strip 23 is adapted to extend radially inwardly from the wire loop so as to contact the tire rim 12 and form a conduit by which static electricity and heat generated in the traction devices can be transmitted to the tire rim for dissipating therethrough in any conventional manner.

Of course, the traction device 10 may be formed from any desired material; usually some alloy steel is used to form this member. Naturally, the steel must have the desired resiliency and strength and toughness required to take the loads to which it is subjected. The traction device can be engaged with a tire in any desired manner, either by pounding the device onto the tire, or by running the tire over the device, or by partially wedging the device into engagement with a tire and then by rotating the wheel so as to bring a load onto the traction device so as to snap it into engagement with the tire. The traction device is of sturdy construction and easily can be pried from engagement with a tire.

Fig. 5 shows a modification of a traction device of the invention wherein a device 30 is shown. This device 30 is of the same construction as the device 10 except that locking dimples, or protuberances 31 are formed on the ends 32 and 33 of the closed wire loop used in forming the device 30. Since such ends 32 and 33 are ordinarily straight and engage with side walls of a pneumatic tire, adjacent the bead of the tire, where portion of the tire is, of course, of arcuate contour, the centers of the ends 32 and 33 tend to be bridged over the side walls of the tire. Hence, the locking or protruding means 31 will engage the center portions of the ends 32 and 33 with the side walls of the tire and aid in retaining the traction device in desired engagement with a pneumatic tire. The traction device 30 has traction portions 34 which are directly in line with the termination points of the ends 32 and 33 so that the device thus differs from that shown in Figs. 1 through 4 in this respect. Fig. 5 clearly brings out that the protuberances 31 are formed only adjacent the center portions of the ends 32 and 33 since such portions of the ends are sections of the device that tend to bridge over the side walls of a tire.

In Fig. 2, the traction element 21 is shown under load and possibly the element would not be flattened as completely as is shown in this figure of the drawings, which may or may not be slightly exaggerated in the portrayal of the deflection of the traction element 21 by load. Obviously, the deflection of the traction element 21 depends upon the material forming same, load applied, etc.

From the foregoing, it will be seen that the resiliency of a pneumatic tire is not lost by using the relatively rigid metallic traction element of the invention. This is due to the fact that the rigid traction device is engaged solely with the pneumatic tire of a wheel and the resiliency inherent in the tire absorbs the shocks, jars, etc., occasioned by use of this traction element. The springy connection or contact member 23 will not interfere with this inherent resiliency of the tire since such contact member normally will be capable of easy deflection. In some instances, it may even be desirable to coat at least the road engaging sections of the traction device of the invention with rubber, or rubber sleeves can be secured thereto, as desired. Thus, a cushioning element will be provided directly on the rigid traction elements to soften the action of same when the traction device of the invention is used on hard, surfaced highways.

While several complete embodiments of the invention have been disclosed herein, it will be appreciated that modification of these particular embodiments of the invention may be resorted to without departing from the scope of the invention as defined by the appended claims.

Having thus described my invention, what I claim is:

1. A traction device particularly adapted for use with pneumatic tires, which device consists of a relatively short, stubby open centered wire loop which has upstanding arcuate end portions adapted for inherent releasable clamping engagement with the side walls of said pneumatic tire, said wire loop being of continuous integral construction and having base portions adapted to engage with the periphery of a tire to provide traction elements thereon, said end portions gripping the side walls radially inwardly of the widest portions thereof and being of shorter height than the radial length of the side walls of said tire with which the device is to be associated but being of such length to extend over the broadest portion of said tire to a point adjacent the bead thereof.

2. A detachable traction device adapted to be mounted on a pneumatic tire comprising a wire loop of generally rectangular form the end portions of which have been bent up into opposed relation with each other to form substantially 90° angles with the remainder of said wire loop which is disposed in a plane, said bent up end portions of said loop being arcuate and being adapted to engage resiliently with the side walls of said pneumatic tire radially inwardly of the widest portions of the side walls, the remainder of said loop being adapted to extend across the periphery of said pneumatic tire and form traction elements therefor, the said end portions being of substantially trapezoidal shape.

3. A traction device for a pneumatic tire mounted on a rim comprising a wire loop of generally rectangular form the end portions of which are similar and have been bent up into opposed relation with each other, said bent up end portions of said loop being arcuate and being adapted to clamp resiliently onto opposed side walls of said pneumatic tire to a point adjacent the beads thereof, the remainder of said loop being adapted to extend across circumferentially spaced portions of the periphery of said pneumatic tire and form traction elements therefor, and a resilient contact arm secured to said wire loop for contacting the rim of said pneumatic tire on which the device is mounted so as to transmit heat and static electricity thereto.

4. A traction device for a pneumatic tire comprising a wire loop of generally rectangular form the end portions of which are similar and have been bent up into opposed relation with each other, said upstanding end portions of said loop being arcuate and being adapted to clamp resiliently onto opposed side walls of said pneumatic tire to a point adjacent the beads thereof, the remainder of said loop being adapted to extend across circumferentially spaced portions of the periphery of said pneumatic tire and form traction elements therefor, the ends of said loop having inwardly extending locking protuberances formed thereon only at the center section thereof.

JOSEPH LA ROCCA.

REFERENCES CITED

The following references are of record in the file of this patent:

UNITED STATES PATENTS

| Number | Name | Date |
|---|---|---|
| 1,256,729 | Reese | Feb. 19, 1918 |
| 1,600,276 | Dombowski | Sept. 21, 1926 |
| 1,869,298 | Borgstrom | July 26, 1932 |
| 2,058,192 | Turulis | Oct. 20, 1936 |
| 2,290,398 | Wellington | July 21, 1942 |
| 2,330,839 | O'Brien | Oct. 5, 1943 |
| 2,532,380 | Tschohl | Dec. 5, 1950 |